(12) United States Patent
López Agüero

(10) Patent No.: US 9,687,967 B2
(45) Date of Patent: Jun. 27, 2017

(54) MANUAL GRIPPING DEVICE FOR CLAMPING OBJECTS

(71) Applicant: Carlos Enrique López Agüero, Lima (PE)

(72) Inventor: Carlos Enrique López Agüero, Lima (PE)

(*) Notice: Subject to any disclaimer, the term of this patent is extended or adjusted under 35 U.S.C. 154(b) by 0 days.

(21) Appl. No.: 15/029,303

(22) PCT Filed: Oct. 14, 2014

(86) PCT No.: PCT/PE2014/000014
§ 371 (c)(1),
(2) Date: Apr. 14, 2016

(87) PCT Pub. No.: WO2015/080606
PCT Pub. Date: Jun. 4, 2015

(65) Prior Publication Data
US 2016/0236327 A1 Aug. 18, 2016

(30) Foreign Application Priority Data

Oct. 15, 2013 (PE) .................. 002341-2013/DIN

(51) Int. Cl.
*B65G 7/12* (2006.01)
*B25B 9/00* (2006.01)

(52) U.S. Cl.
CPC . *B25B 9/00* (2013.01); *B65G 7/12* (2013.01)

(58) Field of Classification Search
CPC .................................. B25B 9/00; B65G 7/12
USPC ............................................ 294/16, 25, 118
See application file for complete search history.

(56) References Cited

U.S. PATENT DOCUMENTS

| 604,758 | A | * | 5/1898 | Jeansen | B66C 1/422 294/106 |
|---|---|---|---|---|---|
| 966,197 | A | * | 8/1910 | Green | A01B 1/18 294/118 |
| 1,479,711 | A | * | 1/1924 | Haarberg | B65G 7/12 16/422 |
| 2,747,917 | A | * | 5/1956 | Smith | A01G 21/00 294/116 |
| 3,365,197 | A | * | 1/1968 | Root | A63D 5/00 294/118 |
| 3,384,407 | A | * | 5/1968 | Thrash | F24B 15/10 294/118 |
| 2003/0151265 | A1 | * | 8/2003 | Smith | B25B 7/00 294/16 |

* cited by examiner

*Primary Examiner* — Dean Kramer
(74) *Attorney, Agent, or Firm* — Eugenio J. Torres-Oyola; Ferraiuoli LLC

(57) ABSTRACT

The invention relates to a mechanical device for manually clamping objects (10), which allows a user to clamp objects which, owing to their characteristics, uses or processes, would be dangerous to the user's hand, as well as simply to clamp different objects. The device consists of five main parts: an upper jaw (15), a lower jaw (25), an upper handle (45), a lower handle (30), and a simple lever two-point shaft (65). In order to clamp an object with the device, the user inserts his/her thumb into the thumb hole (35) in the lower handle (30) and the rest of the fingers into the upper handle (45). By expanding the fingers of the hand the upper (15) and lower (25) jaws open and by contracting the fingers the jaws close. Objects are clamped on the opposite side of the palm. This device (10) can be used ambidextrously.

8 Claims, 16 Drawing Sheets

MANUAL GRIPPING DEVICE FOR CLAMPING OBJECTS

1. FIELD OF THE ART

The invention is related to the manufacture of a mechanical device called Manual Gripping Device for Clamping Objects, destines to be a device for manually clamping objects.

2. PREVIOUS TECHNOLOGY

There are diverse mechanical devices of manually clamping objects on the market, we can find: Tweezers, tongs, pliers, hooks, etc. The applications of these devices are diverse, therefore the use and scope is widespread, as it is in:
  Hearths
  Workshops
  Commerce
  industries
  Laboratories
  Agriculture activities, among others.

A manual gripping device for clamping objects, it is a mechanical device for manually clamping objects its characteristic is that, the hand has no direct contact with the clamped object, keeping a distance separation between the clamped object and the hand, this is in order to prevent possible damages to the hand, like cuts, burns, contaminations, etc., caused by hazards related to proper characteristics of the object or of uses and processes that takes the object. The main parts that compose a manual clamping objects device are the following:
  Upper jaw
  Lower jaw
  Handles
  Bolts, nuts, among others Some manual gripping devices for clamping objects also include an axis of point of simple lever.

In general they work with the mechanism of simple lever, and the materials used in their manufacture are metals, plastics, wood, and rubbers, among other.

Operation

The manual pressure on the handles of this device generates a torque that is transmitted by an axis to the jaws of this device, which generates a clamping force on the object located between these jaws.

Technical Disadvantage

The manual mechanical devices for clamping objects existing on the market are characterized for the existence of an axis of point of simple lever, like pincer and pliers among others; and those which not consider any axis of point of simple lever, like the tweezers.

In general, the clamping object is realized in an end of the hand, in the axis formed by the fingers of the hand when these form a fist, it does that in the clamping object with this device, there is generated a torque formed by the weight of the clamped object and the distance from the hand to the jaws of this device, which in general correspond to the length of the handles. Major all that is the length of the handles, mayor will be the torque that the user has to overcome, for the clamping object in an uncomfortable position for the hand of the user.

3. DESCRIPTION OF THE INVENTION

The manual gripping device for clamping objects is designed to allow to the user to clamp in a secure way diverse objects. The clamping objects are carried out by the pressure on the object by a pair of jaws, which are driven by a pair of handles.

It consists of:

An upper jaw of bite of clamping, call upper jaw, which is used to make clamping pressure on one side of the object. It consists of a laminar structure that imitates the shape of the upper jaw of the bony structure of a mammal, and has an array of teeth. Also this upper jaw can be constructed by a tubular or solid structure of circular, square or rectangular transversal surface.

A lower jaw of bite of clamping, call lower jaw, which is used to make clamping pressure on the opposite side than is made by the upper jaw. It consists of a laminar structure that imitates the shape of the lower jaw of the bony structure of a mammal, and has an array of teeth. Also this lower jaw can be constructed by tubular or solid structure of circular, square or rectangular transversal surface.

An axis of simple lever, called simple lever two-point shaft, which is used for the transference of the torques generated by the pressure of the hand of the user on the upper handle and the lower handle, which by the simple lever principle generates torques in the upper jaw and the lower jaw. To the use of this device by the user, this simple lever two-point shaft is located on the opposite side of the palm.

An upper handle assembly, called upper handle, which is used by the user to generate a torque by the pressure of the fingers of the user's hand, from the index finger to the little finger, on this handle. This torque is transferred by the simple lever two-point shaft to the upper jaw.

A lower handle assembly, called lower handle, which is used by the user to generate a torque by the pressure of the thumb of the hand of the user on this handle. This torque is transferred by the simple lever two-point shaft to the lower jaw.

The clamping objects, are carried out by the pressure of the user's hand on the handles of the upper handle and the lower handle, which generate torques that are transferred by the simple lever two-point shaft, causing the closing of the jaws, which generates pressure on opposites sides of the object. Finally, the object is clamped on the opposite side of the palm.

The main point of this invention is to provide a device that allows to the user to clamp objects which, owing to their characteristics, uses or process, would be dangerous to the user's hand. As well as simply to clamp different objects.

Also others purposes of this invention are to provide a device that:
1) Offer major protection to the hand of the user
2) Give higher performance in the clamping objects
3) Use the normal movement and rotation of the hand
4) Be of ambidextrous use by a simple change in the lower handle assembly

4. DESCRIPTION OF THE DRAWINGS

Others characteristics and advantages of the present invention will become apparent from a description of each of the parts, with reference to the accompanying drawings, in which.

5. PREFERRED EMBODIMENT OF THE INVENTION

Figure 1:
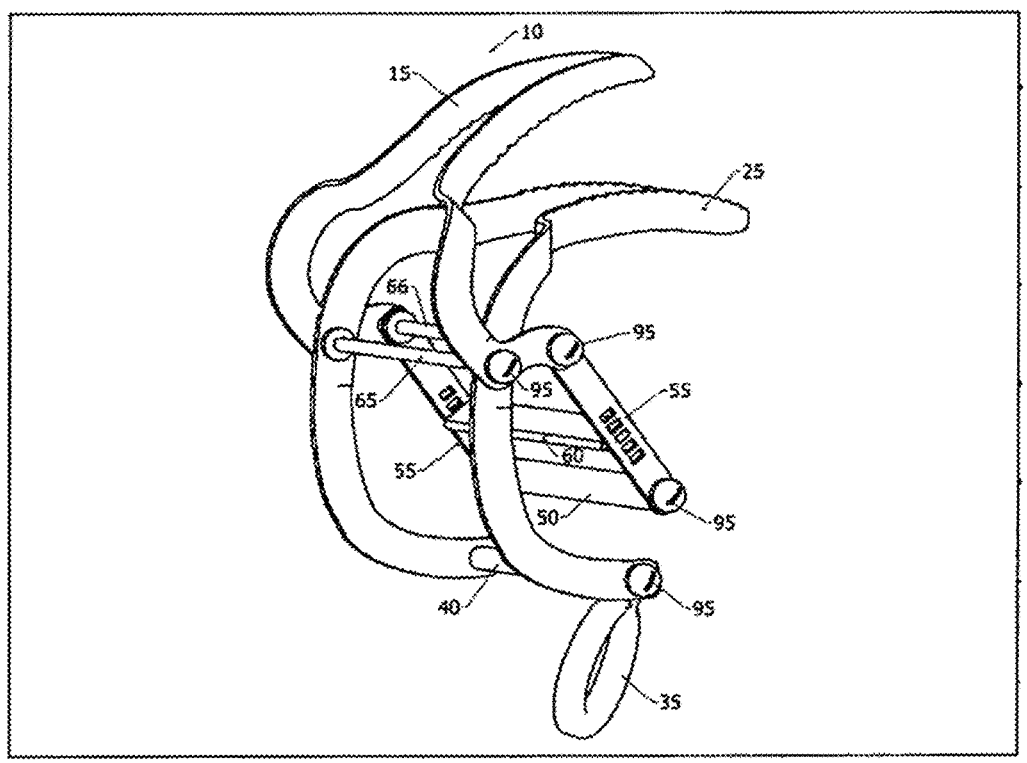
FIG. 1, is a schematic view of the invention.

The best way to implement this manual gripping device for clamping objects 10 is to be presented in terms of a preferred embodiment designed to allows a user to clamp objects which, owing to their characteristics, uses or process, would be dangerous to the user's hand. As well as simply to clamp different objects.

The preferred embodiment of this device 10 is as shows in the FIGS. 1 to 16, which comprise of five major elements: the upper jaw 15, the lower jaw 25, the upper handle 45, the lower handle 30, and the simple lever two-point shaft 65. It is designed to operate by the insertion of the fingers of the hand of the user in the handles of this device. All these major elements can be constructed preferably with steel, or another metal or material that by their features resist physical comprehensions and tensions inherent to the use of the device, also it could be covered with ergonomic materials, thermal isolation materials, and electrical isolation materials, like wood, plastics, rubbers, among others.

Figure 2:
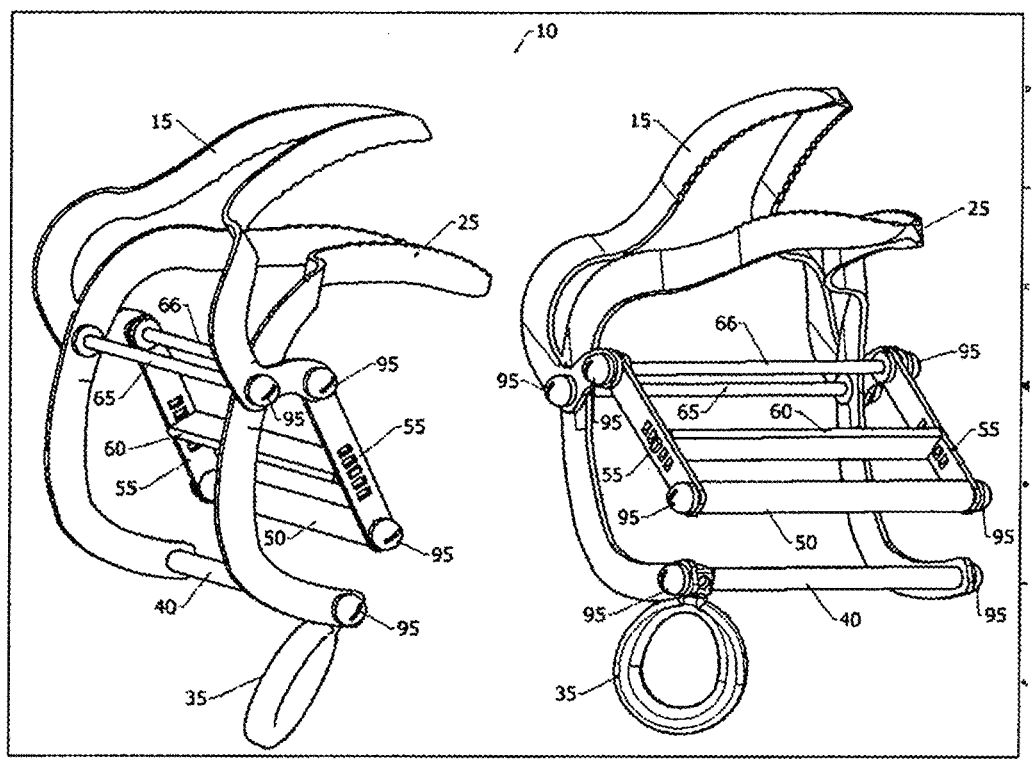
FIG. 2, shows two schematics views of the invention.
Figure 3:
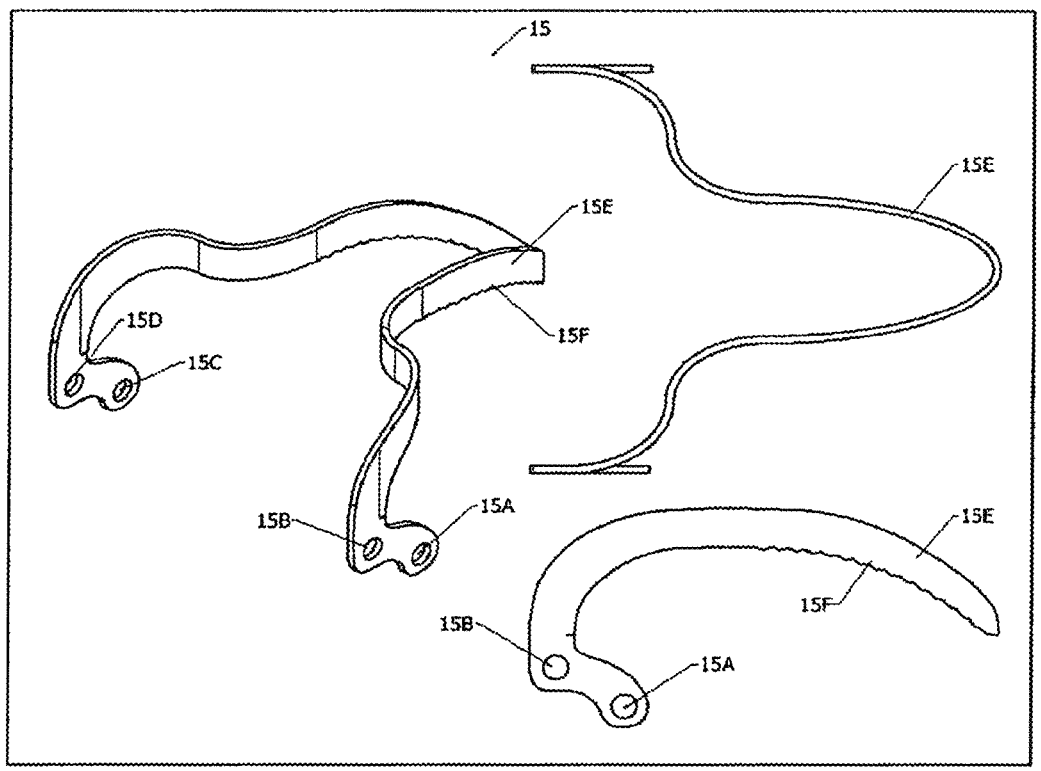
FIG. 3, shows the upper jaw in one isometric perspective view, one top view, and one lateral view.

The upper jaw 15 is shown in the FIGS. 1, 2 and in detail in the FIG. 3. This upper jaw 15 consists of a laminar structure 15E which imitates the shape of the upper jaw of the bony structure of a mammal, has an array of teeth 15F, in its middle part has two holes 15B and 15D for the assembly with the lower jaw 25 and the simple lever two-point shaft 65, and in its lower part has two holes 15A and 15C for the assembly with the upper handle 45. The holes 15A, 15B, 15C, and 15D have of equal diameter to the diameters of the threaded terminals 65D and 65E of the simple lever two-point shaft 65. Additionally, the surface where is located the array of teeth 15F, can be continuous, similar to continuous surface of a palette, with an array of teeth in this entire surface. Also, this upper jaw 15 can consists of a tubular or solid structure with circular, square or rectangular transversal surface, and it can take other shapes as are shown in the FIG. 14.

Figure 4:
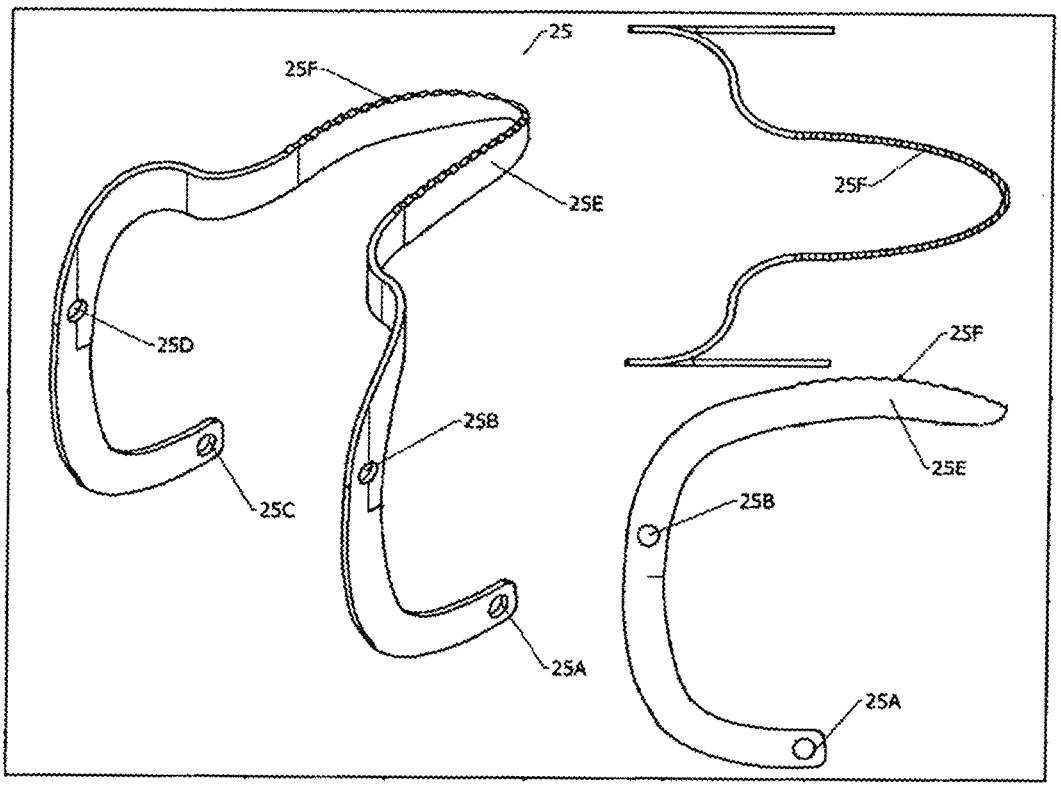
FIG. 4, shows the lower jaw in one isometric perspective view, one top view, and one lateral view.
Figure 5:
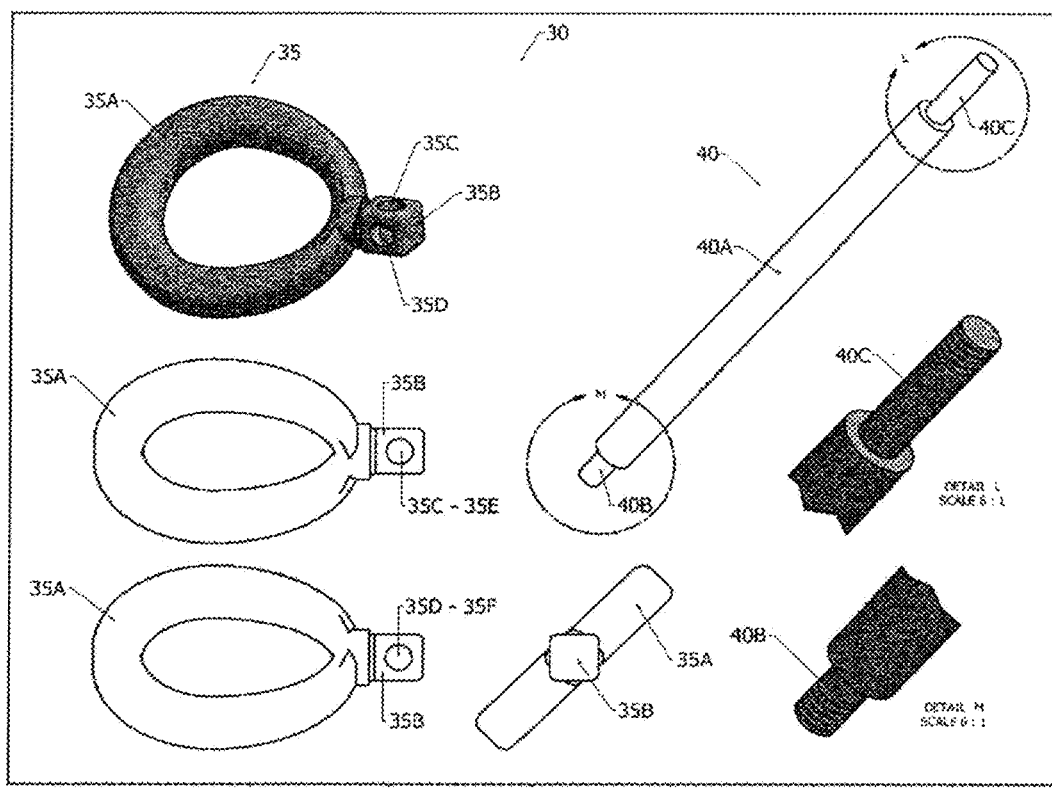
FIG. 5, shows the components parts of the lower handle in two isometric perspective views, one frontal view, one top view, one lateral view, and two detail views.
Figure 6:
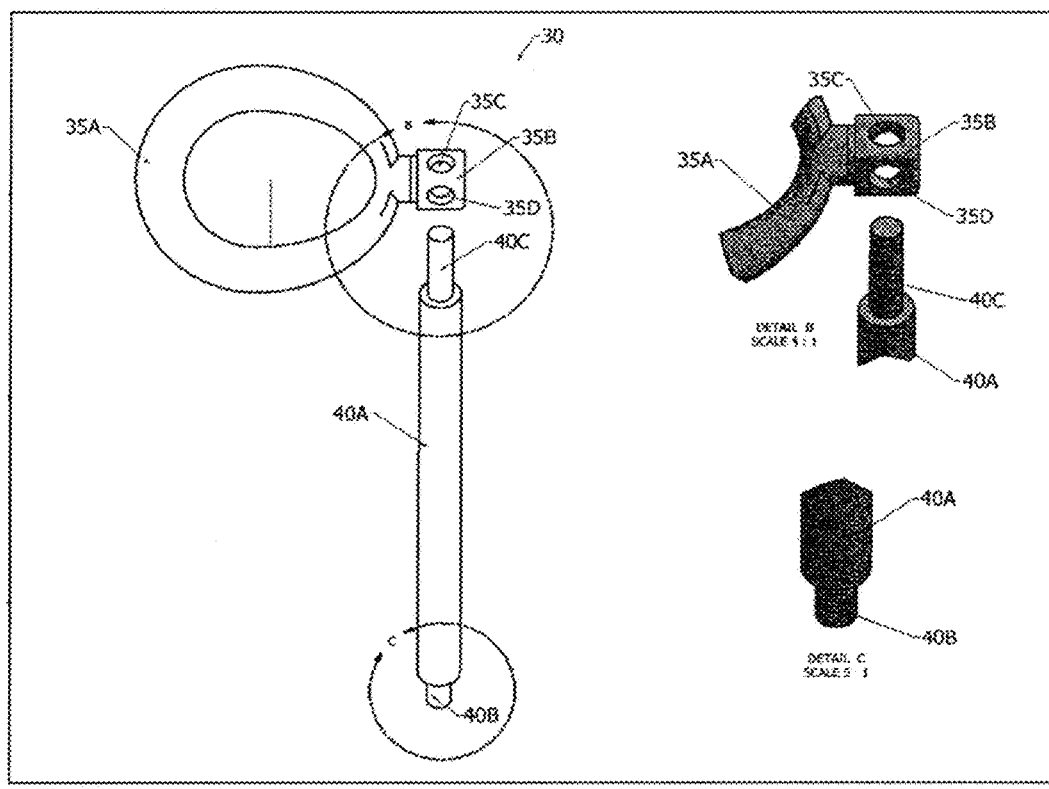
FIG. 6, shows the disintegrated assembly of the lower handle, and two detail views.
Figure 7:
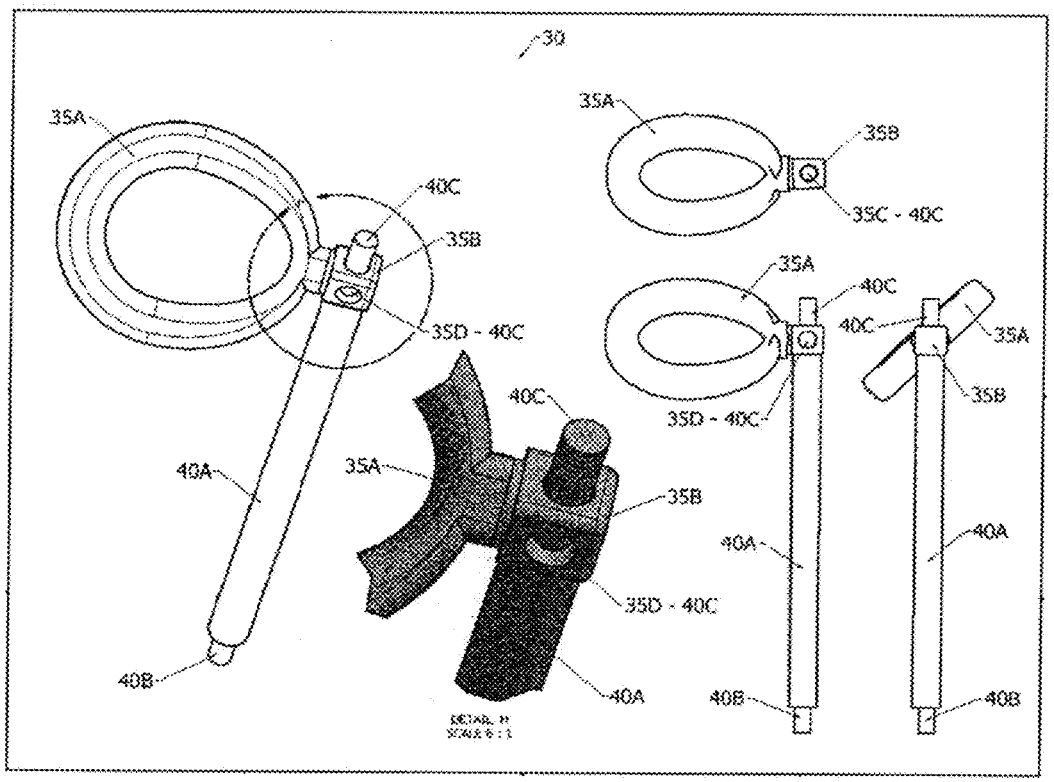
FIG. 7, shows the lower handle assembly in one isometric perspective view, one frontal view, one top view, one lateral view, and one detail view.

The lower jaw 25 is shown in the FIGS. 1, 2, and in detail in the FIG. 4. This lower jaw 25 consists of a laminar structure 25E which imitates the shape of the lower jaw of the bony structure of a mammal, has an array of teeth, in its middle part has two holes 25B and 25D for the assembly with the upper jaw 15 and the simple lever two-point shaft 65, and in its lower part has two holes 25A and 25C for the assembly with the lower handle 30. The holes 25A, 25B, 25C, and 25D have of equal diameter to the diameters of the threaded terminals 65D and 65E of the simple lever two-point shaft 65. Additionally, the surface where is located the array of teeth 25F, can be continuous, similar to continuous surface of a palette, with an array of teeth in this entire surface. Also, this lower jaw 25 can consists of tubular or solid structure with circular, square or rectangular transversal surface, and it can take others shapes as are shown in the FIG. 14.

Figure 13:
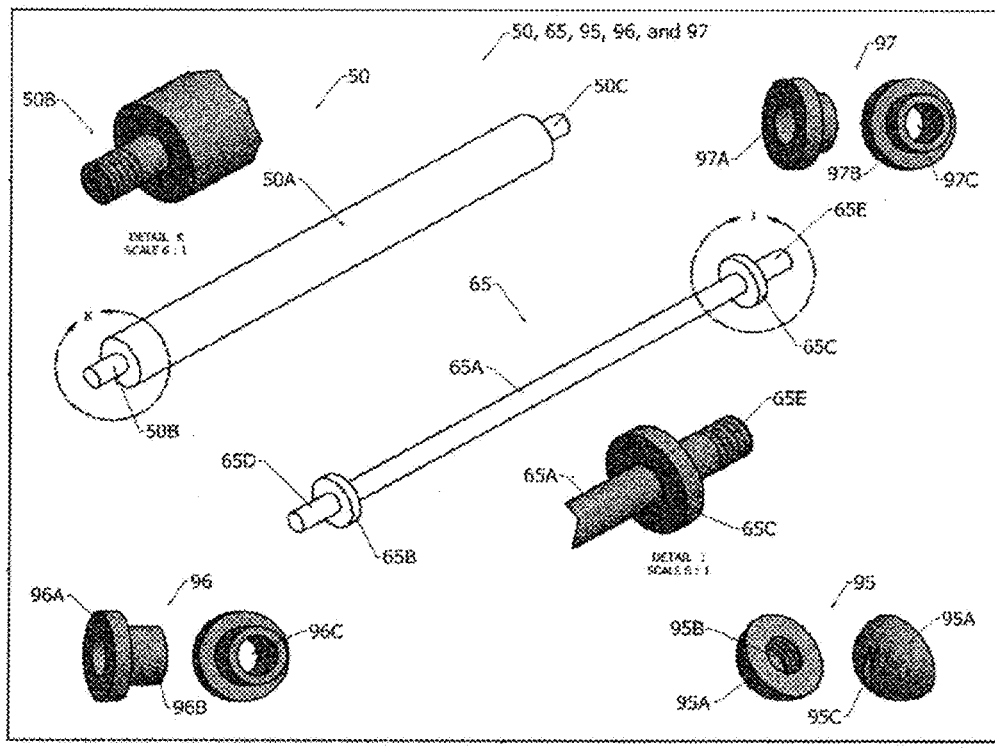
FIG. 13, shows the components parts of the lower handle and the upper handle, and other components parts of this device in isometric perspective views.
Figure 14:
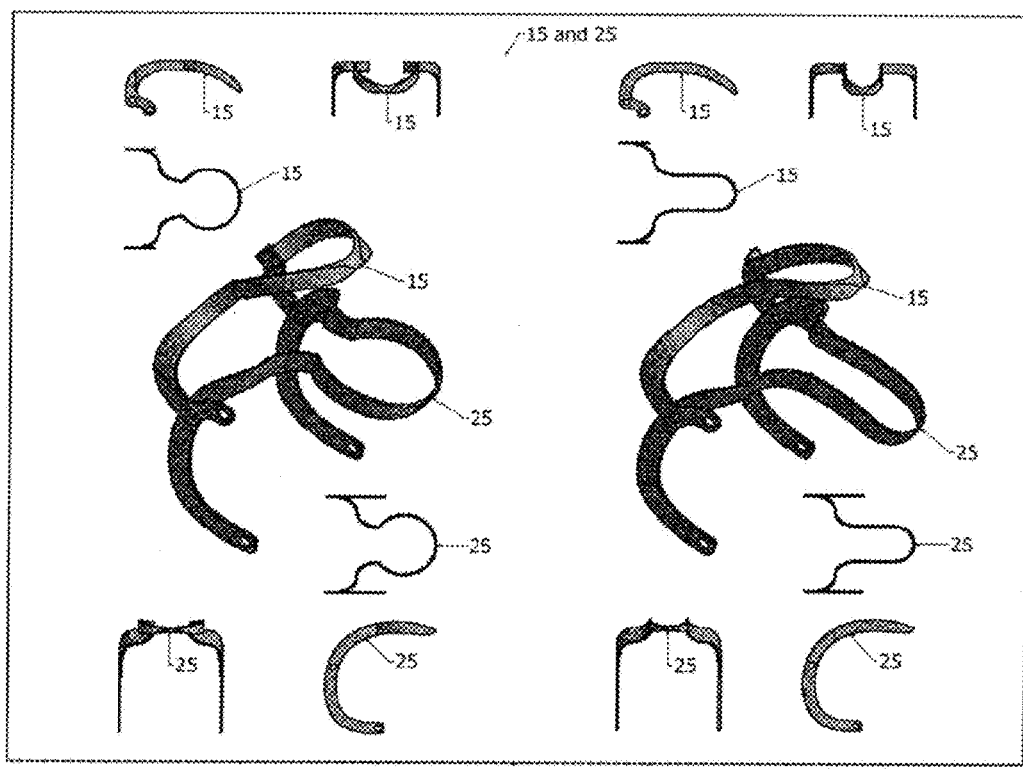
FIG. 14, shows additional shapes of the upper jaw and the lower jaw in isometric perspective views, frontal views, top views, and lateral views.

The simple lever two-point shaft 65 is shown in the FIGS. 1, 2, and in detail in the FIG. 13. This simple lever two-point shaft 65 consists of a solid cylindrical structure 65A, has two circular rings 65B and 65C in both ends, and has threaded terminals 65D and 65E in its ends. The diameter of the solid cylindrical structure 65A is not necessarily the same as the diameter of the threaded terminals 65D and 65E.

The lower handle 30 is shown in the FIGS. 1, 2, and in detail in the FIGS. 5, 6, 7, and 13. This assembly consists of a handle 40, a thumb hole 35, two washers 97, and two nuts 95. The handle 40 consists of a rod of cylindrical body 40A, has two threaded terminals 40B and 40O in both ends, of less diameters to the diameter of the rod of cylindrical body 40A, and of equal diameter to the diameter of the threaded terminals 65D and 65E of the simple lever two-point shaft 65. The thumb hole 35 consists of an oval structure 35A, with a cubic structure 35B which has four holes 35C, 35D, 35E, y 35F in four faces of the cubic structure 35B, of equal diameter to the diameter of the threaded terminals 65D and 65E of the simple lever two-point shaft 65, the oval structure 35A and the face of the cubic structure 35B where is the hole 35C are located in two intersecting planes forming an angle between 30 to 60 degrees.

Assembled of the lower handle 30 for the use of this device 10 with the left hand—The threaded terminal 40C of the handle 40 is assembled with the cubic structure 35B of the thumb hole 35 in the holes 35C and 35E, the same one which is assembled with the hole 25A of the lower jaw 25, the threaded terminal 40B of the handle 40 is assembled with the hole 25C of the lower jaw 25, two washers 97 and two nuts 95 complete this assembly.

Assembled of the lower handle 30 for the use of this device 10 with the right hand—The threaded terminal 40C of the handle 40 is assembled with the cubic structure 35B of the thumb hole 35 in the holes 35D and 35F, the same one which is assembled with the hole 25C of the lower jaw 25, the threaded terminal 40B of the handle 40 is assembled with the hole 25A of the lower jaw 25, two washers 97 and two nuts 95 complete this assembly.

The upper handle 45 is shown in the FIGS. 1, 2, and in detail the FIGS. 8, 9, 10, 11, 12, and 13. This assembly consists of a handle 50, two arms 55, one finger-adjustment rod assembly 60, one mounting shaft 66, two washers 96, two washers 97, and four nuts 95. The handle 50 consists of a rod of cylindrical body 50A, has two threaded terminals 50B and 50C in both ends, of less diameters to the diameter of the rod of cylindrical body 50A, and of equal diameter to the diameter of the threaded terminals 65D and 65E of the simple lever two-point shaft 65. The arm 55 consists of a rod of rectangular body 55A, has two holes 55B and 55C, of equal diameter to the diameter of the threaded terminals 65D and 65E of the simple lever two-point shaft 65, and has rectangular perforations of adjustment of fingers 55D.

Assembled of the Upper Handle 45—

The terminals 50B and 50C of the handle 50, are assembled with the holes 55C of the arms 55, the terminals 66D and 66E of the mounting shaft 66 are assembled with the holes 55B of the arms 55, and with the holes 15A and 15C of the upper jaw 15. Two washers 96, two washers 97, and four nuts 95 complete this assembly. The finger-adjustment rod assembly 60 is inserted in the rectangular perforations of adjustment of fingers 55D of the arms 55, adjusted according to the thickness of the fingers of the hand of the user.

Complete the assembly of the manual gripping device for clamping objects 10, with the terminals 65D and 65E of the simple lever two-point shaft 65 assembled in the holes 15B-25B and 15D-25D, of the upper jaw 15 and the lower jaw 25 respectively.

The mounting shaft 66 is equal to the simple lever two-point shaft 65.

The washer 96 consists of a circular structure 96A, from which it derives a second concentric circular structure 96B, with lesser diameter to the diameter of the circular structure 96A, and of equal length to the sum of the thickness of the upper jaw 15 and the lower jaw 25. It has a circular hole 96C, concentric to the circular structure 96A, of equal diameter to the diameter of the threaded terminals 65D and 65E of the simple lever two-point shaft 65.

The washer 97 is similar to the washer 96, but the length of the circular structure 97B is a half of the length of the circular structure 96B.

The nut 95, consists of a structure of a half sphere 95A, has a threaded circular hole 95B in the flat surface, of equal diameter to the diameter of the threaded terminals 65D and 65E of the simple lever two-point shaft 65, and has a groove 95C for the insertion a flathead screwdriver.

Figure 8:
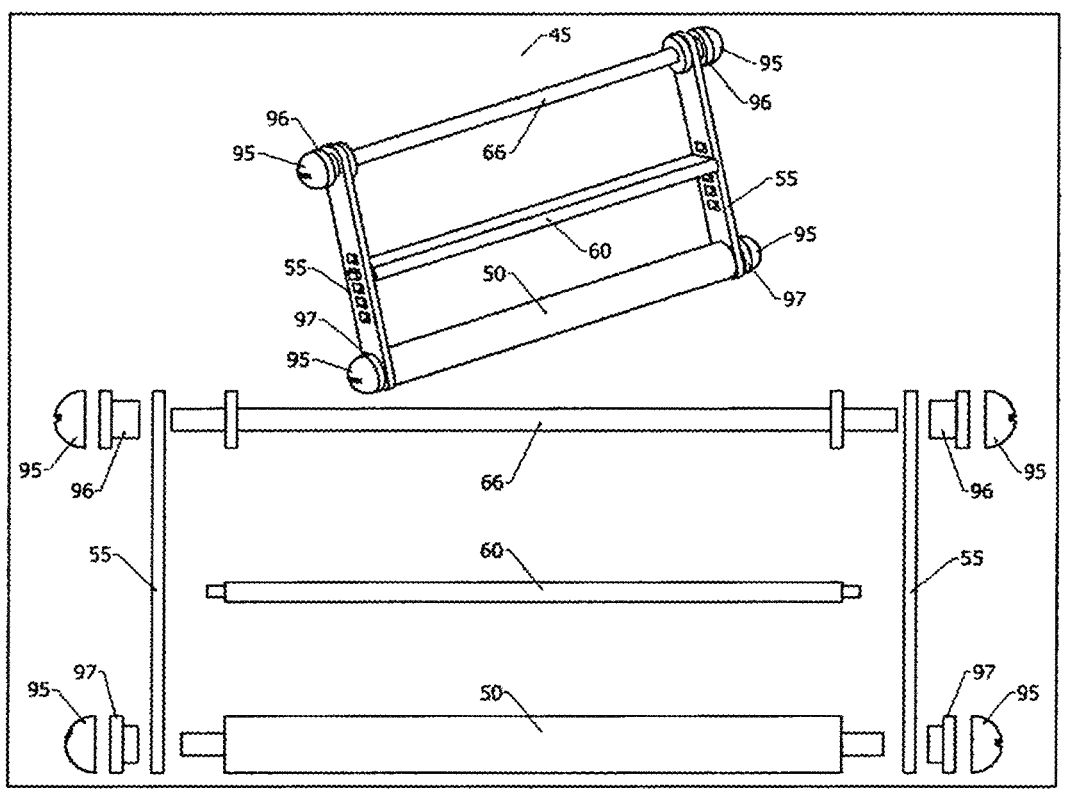
FIG. 8, shows the upper handle assembly in one isometric perspective view, and one disintegrated assembly view.
Figure 9:
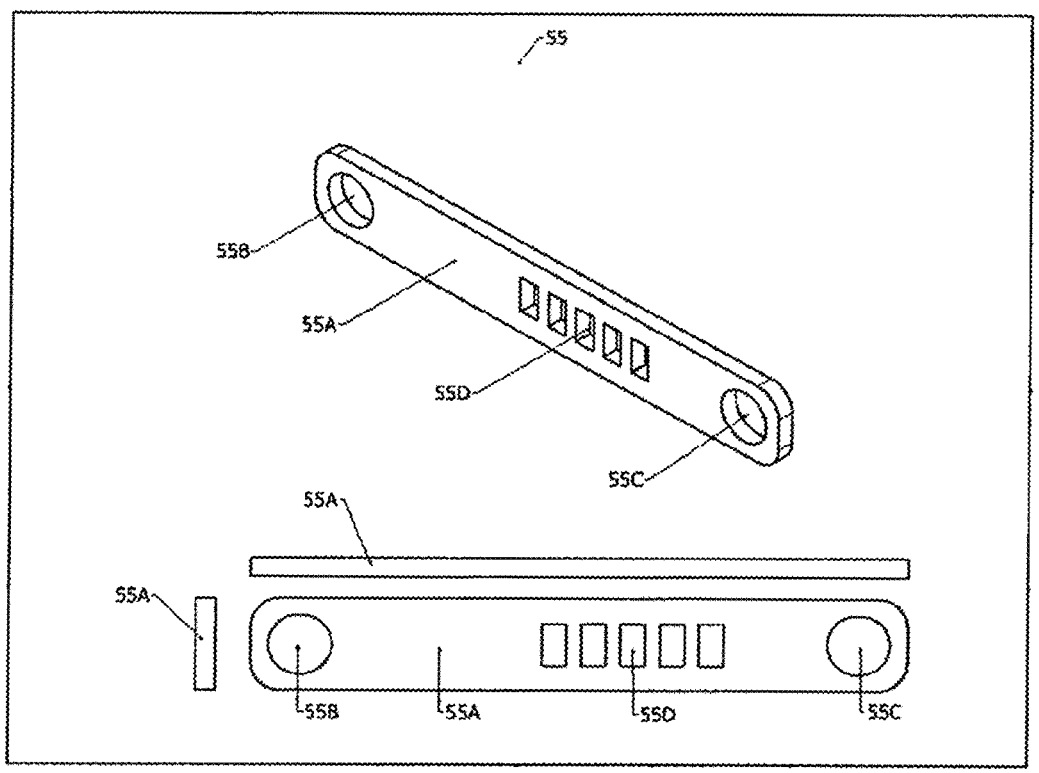
FIG. 9, shows one of the two arms of the upper handle in one isometric perspective view, one frontal view, one top view, and one lateral view.
Figure 10:
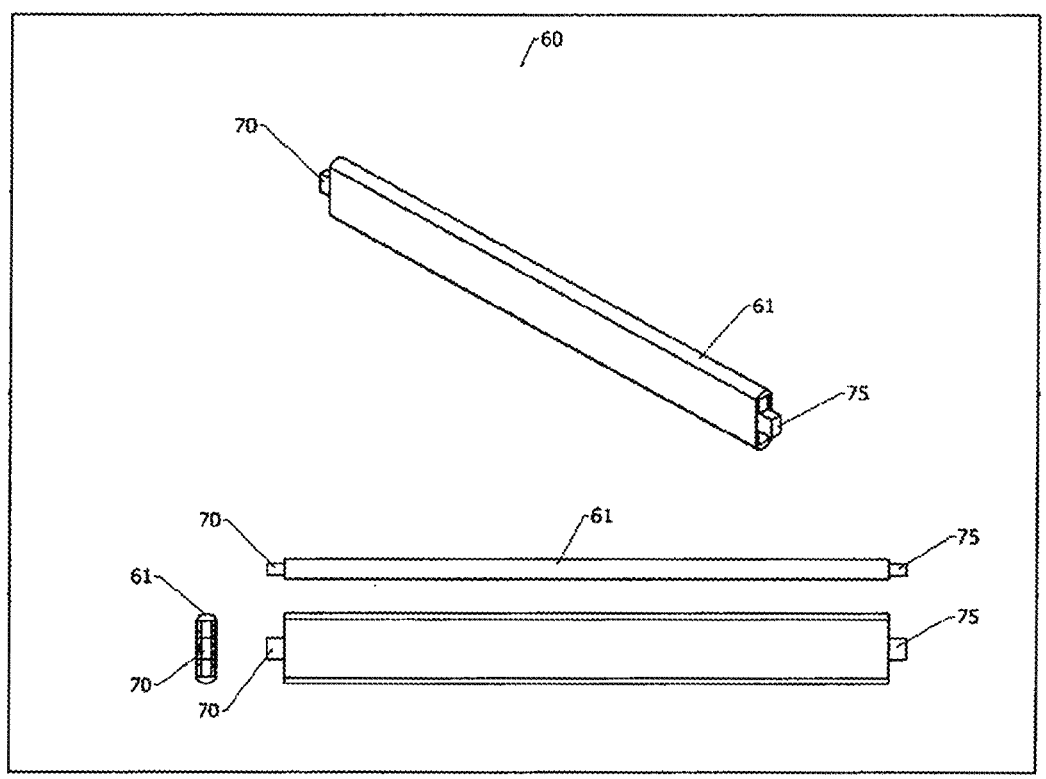
FIG. 10, shows the finger-adjustment rod assembly of the upper handle in one isometric perspective view, one frontal view, one top view, and one lateral view.
Figure 11:
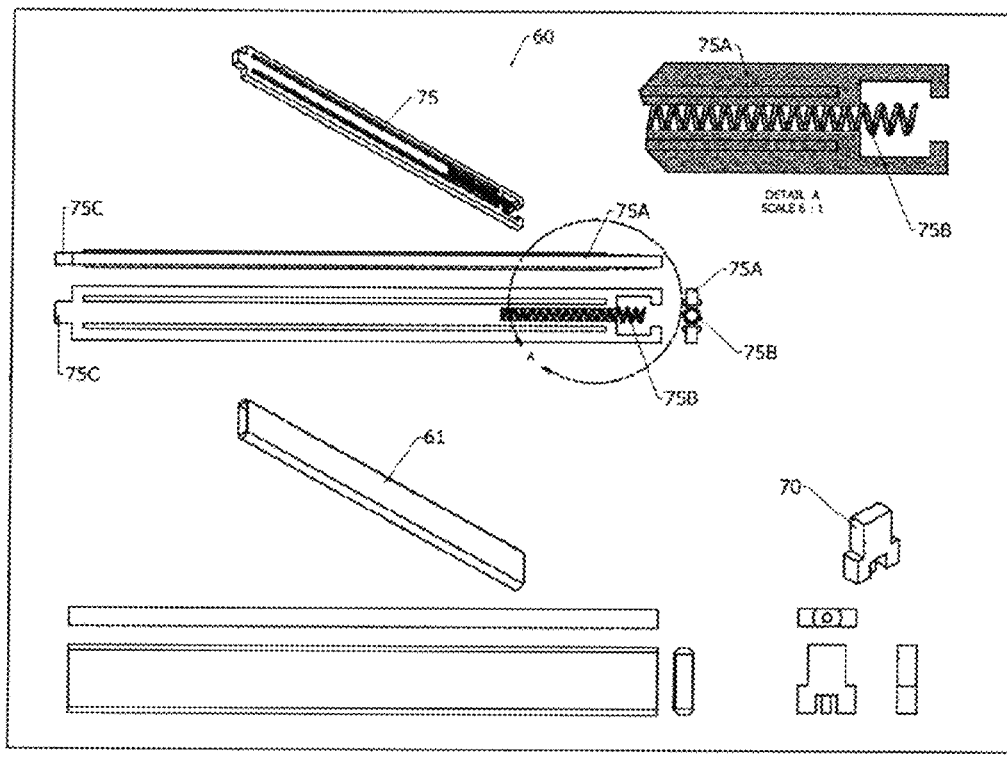
FIG. 11, shows the components parts of the finger-adjustment rod assembly of the upper handle in isometric perspective views, frontal views, top views, lateral views, and one detail view.
Figure 12:
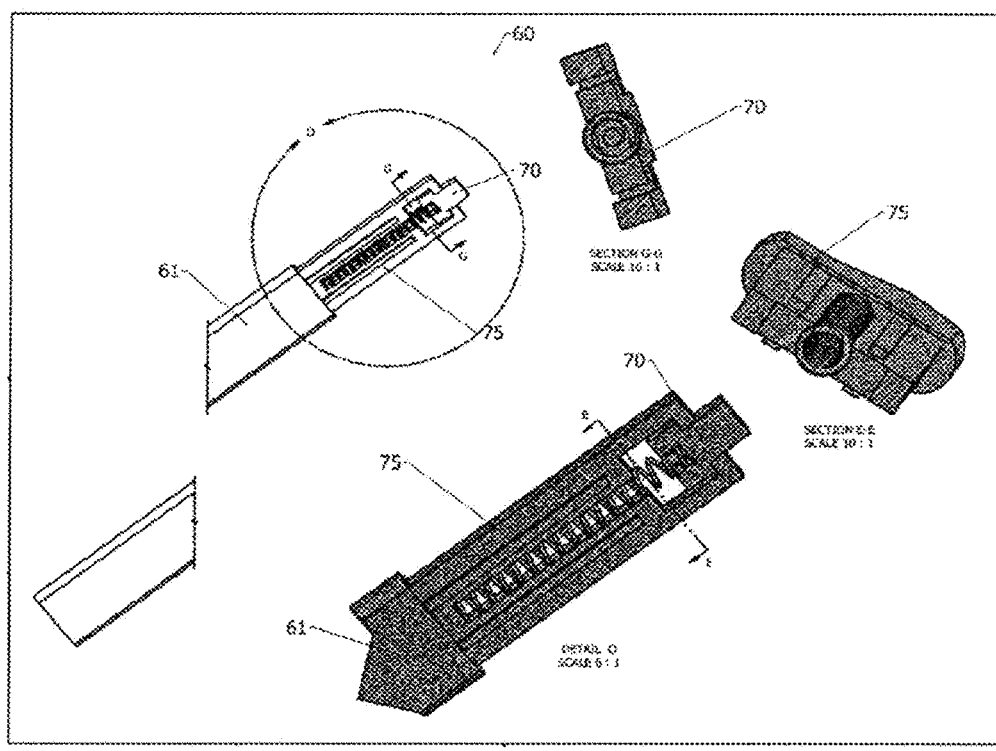
FIG. 12, shows the components parts of the finger-adjustment rod assembly of the upper handle in details views.

The finger-adjustment rod assembly 60 is shown in the FIGS. 1, 2, 8, and detail in the FIGS. 10, 11, and 12. This assembly presents a rod 75, a push-piece 70, and a cover 61. The rod 75 has a central structure 75A with a spike 75C at one end, and at the other end has a cavity with a spring 75B inside. The push-piece 70 has a spike and is assembled inside the cavity of the rod 75. Finally, the cover 61 covers the assembly.

Operation

The manual gripping device for clamping objects 10 is designed to provide the user the best clamping objects. Before to the clamping object operation, the thumb of the hand is inserted into the thumb hole 35 in the lower handle 30, and the others fingers of the hand (from the index finger to the little finger) are inserted into the upper handle 45, in the space between the handle 50 and the finger-adjustment rod assembly 60.

Figure 15:
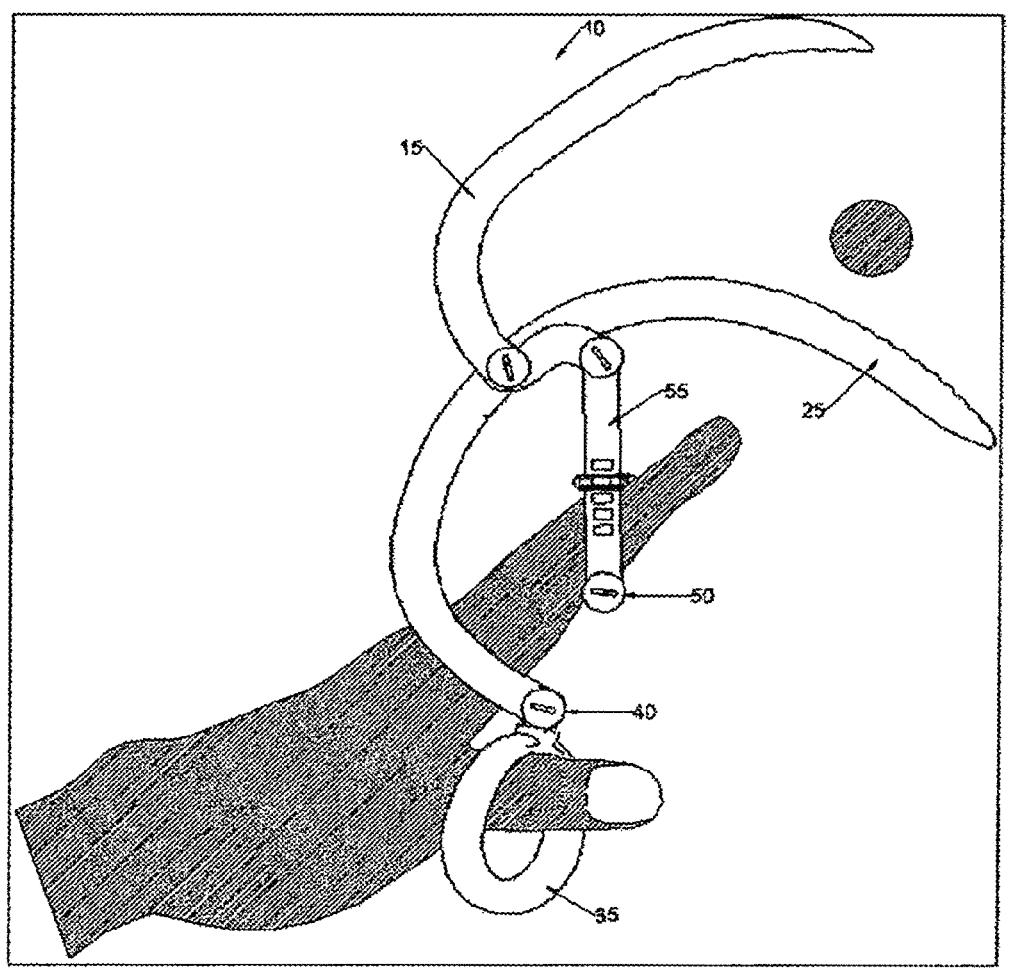
FIG. 15, shows the opening operation action of this device.
Figure 16:
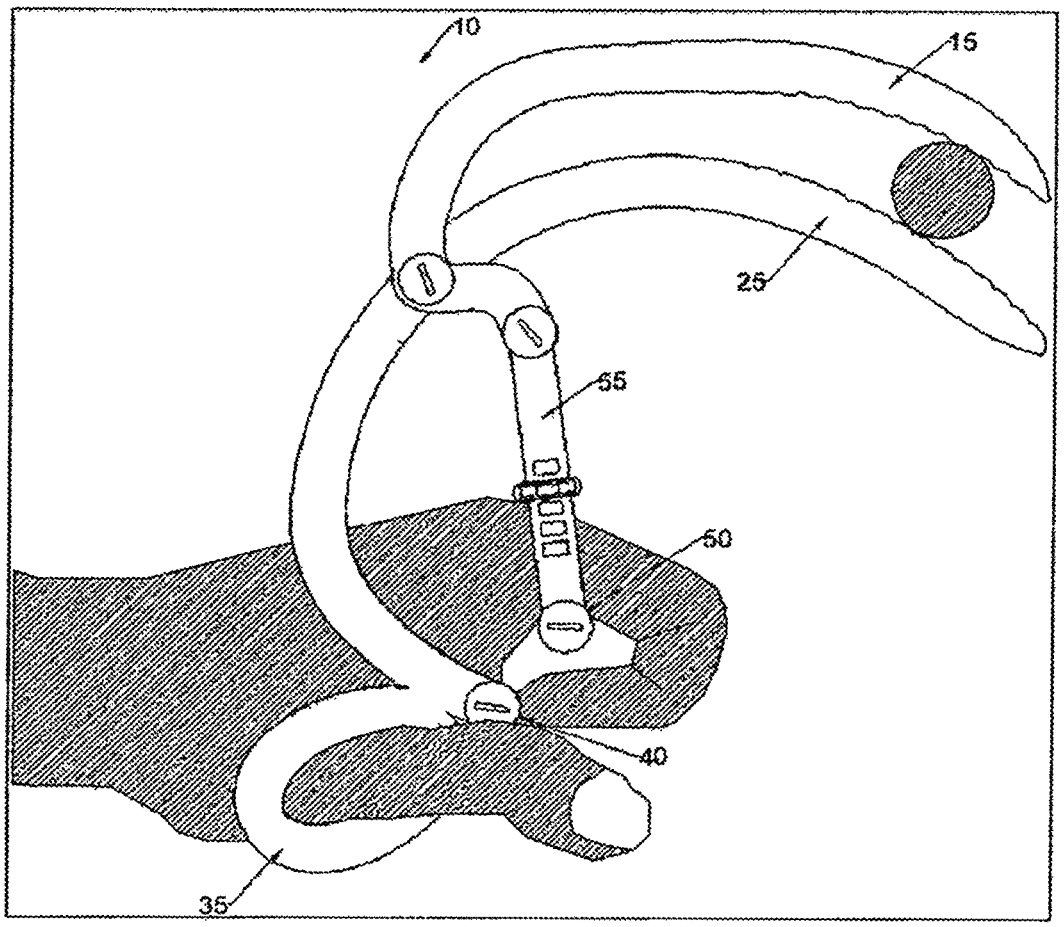
FIG. 16, shows the closing operation action of this device.

A clamping object operation is realized by the following steps:

1) Open operation—When the manual gripping device for clamping objects 10 is ready to clamp an object, as is shown in the FIG. 15. The fingers of the hand are expanded, it does that the upper handle assembly 45 and the lower handle assembly 30 separate between them, causing the opening of the upper jaw 15 and the lower jaw 25.
2) Close operation—When the manual gripping device for clamping objects 10 is clamping an object, as is shown in the FIG. 16. The fingers of the hand are contracted and exerting pressure on the handle 40 of the lower handle 30 and on the handle 50 of the upper handle 45, causing the closing of the upper jaw 15 and the lower jaw 25, which generates pressure on sides opposites of the object, which finally clamp to the object on the opposite side of the palm.

The invention claimed is:

1. A manual gripping device for clamping objects, comprising:
   an upper jaw (15) of a continuous structure (15E) which imitates the shape of upper jaw of the bony structure of a mammal, which has an array of teeth (15F);
   an upper handle (45) which drives the upper jaw (15), which has a handle (50), a pair of arms (55), and a fingers-adjustment rod (60), and which is assembled to the upper jaw with bolts and nuts or rivets;
   the pair of arms (55) which have perforations (55D);
   the fingers-adjustment rod (60) which fits in the perforations (55D);
   a lower jaw (25) of a continuous structure (25E) which imitates the shape of lower jaw of bony structure of a mammal, which has an array of teeth (25F), and which is assembled to the upper jaw with bolts and nuts or rivets; and
   a lower handle (30) which drives the lower jaw (25), which has a handle (40) and a thumb hole (35), and which is assembled to the lower jaw with nuts or rivets;
   which in order to clamp an object with the device, the user inserts his/her thumb into the thumb hole (35) in the lower handle (30) and the rest of the fingers into the upper handle (45), by expanding the fingers of the hand the upper jaw (15) and lower jaw (25) open and by contracting the fingers the jaws close, wherein the upper jaw (15), the lower jaw (25), and the clamped object are located on the opposite side of the user's palm.

2. The device according to claim 1, comprising a simple lever two-point shaft (65) which assembles the upper jaw (15) with the lower jaw (25).

3. The device according to claim 1, wherein the cross section of the continuous structure of the upper jaw and the continuous structure of the lower jaw are rectangular, square, circular, or another geometrical shape.

4. The device according to claim 1, wherein the upper jaw (15) and the lower jaw (25) are totally or partially covered with fixed or removable rubber or thermal insulation materials.

5. The device according to claim 1, wherein the upper handle (45) and the lower handle (30) are covered with thermal insulation materials or electrical insulation materials.

6. The device according to claim 1, comprising a mounting shaft (66) which assembles the upper jaw (15) with the upper handle.

7. The device according to claim 1, wherein the device is used ambidextrously.

8. The device according to claim 1, wherein the array of teeth of the upper jaw and the array of teeth of the lower jaw are on surfaces similar to a palette or a palate of a mammal.

* * * * *